United States Patent
Limbacher

(10) Patent No.: US 10,793,152 B2
(45) Date of Patent: Oct. 6, 2020

(54) METHOD FOR ASSISTING A DRIVER IN TIME-EFFICIENTLY PERFORMING A JOURNEY WITH A MOTOR VEHICLE, AND MOTOR VEHICLE

(71) Applicant: Audi AG, Ingolstadt (DE)

(72) Inventor: Reimund Limbacher, Ingolstadt (DE)

(73) Assignee: Audi AG, Ingolstadt (DE)

( * ) Notice: Subject to any disclaimer, the term of this patent is extended or adjusted under 35 U.S.C. 154(b) by 238 days.

(21) Appl. No.: 15/750,338

(22) PCT Filed: Jun. 18, 2016

(86) PCT No.: PCT/EP2016/001038
§ 371 (c)(1),
(2) Date: Feb. 5, 2018

(87) PCT Pub. No.: WO2017/025163
PCT Pub. Date: Feb. 16, 2017

(65) Prior Publication Data
US 2018/0222478 A1 Aug. 9, 2018

(30) Foreign Application Priority Data

Aug. 7, 2015 (DE) .......................... 10 2015 010 292

(51) Int. Cl.
*B60W 30/14* (2006.01)
*B60W 50/16* (2020.01)
(Continued)

(52) U.S. Cl.
CPC .......... *B60W 30/143* (2013.01); *B60W 10/04* (2013.01); *B60W 30/14* (2013.01);
(Continued)

(58) Field of Classification Search
CPC ............... B60W 30/143; B60W 30/14; B60W 30/18009; B60W 10/04; B60W 50/0097; B60W 50/082; B60W 50/14; B60W 50/16
See application file for complete search history.

(56) References Cited

U.S. PATENT DOCUMENTS

| 5,485,381 A | 1/1996 | Heintz et al. |
| 8,063,755 B2 | 11/2011 | Eikelenberg et al. |
| | (Continued) | |

FOREIGN PATENT DOCUMENTS

| CN | 102416947 A | 4/2012 |
| CN | 103523016 A | 1/2014 |
| | (Continued) | |

OTHER PUBLICATIONS

English-language Abstract of German Patent Application Publication No. DE 19843395 A1, published Mar. 23, 2000; 1 page.
(Continued)

*Primary Examiner* — Behrang Badii
*Assistant Examiner* — Daniel L Greene
(74) *Attorney, Agent, or Firm* — Sterne, Kessler, Goldstein & Fox P.L.L.C.

(57) ABSTRACT

A method is provided for assisting a driver in carrying out a time-efficient trip with a motor vehicle. The method includes outputting an acceleration request to the driver when at least one event criterion occurs, where the one event criterion includes the motor vehicle operating more slowly than a time-efficient target speed assigned to the current position of the motor vehicle.

30 Claims, 4 Drawing Sheets

(51) Int. Cl.
*B60W 10/04* (2006.01)
*B60W 50/14* (2020.01)
*B60W 50/00* (2006.01)
*B60W 30/18* (2012.01)
*B60W 50/08* (2020.01)

(52) U.S. Cl.
CPC .. *B60W 30/18009* (2013.01); *B60W 50/0097* (2013.01); *B60W 50/082* (2013.01); *B60W 50/14* (2013.01); *B60W 50/16* (2013.01); B60W 2050/0095 (2013.01); B60W 2050/143 (2013.01); B60W 2050/146 (2013.01); B60W 2400/00 (2013.01); B60W 2420/403 (2013.01); B60W 2420/42 (2013.01); B60W 2520/10 (2013.01); B60W 2540/30 (2013.01); B60W 2552/30 (2020.02); B60W 2554/00 (2020.02); B60W 2554/801 (2020.02); B60W 2555/60 (2020.02); B60W 2556/00 (2020.02); B60W 2556/50 (2020.02); B60W 2710/10 (2013.01); B60W 2720/106 (2013.01); B60Y 2200/11 (2013.01)

(56) References Cited

U.S. PATENT DOCUMENTS

| | | | |
|---|---|---|---|
| 9,120,462 B2 | 9/2015 | Jonsson et al. | |
| 9,469,298 B2 | 10/2016 | Hayasaka | |
| 2008/0190681 A1* | 8/2008 | Mayser | B60K 31/042 180/170 |
| 2008/0195292 A1* | 8/2008 | Naab | B60W 30/16 701/93 |
| 2010/0198450 A1* | 8/2010 | Shin | B60W 30/14 701/31.4 |
| 2011/0044470 A1* | 2/2011 | Ogata | B60R 21/34 381/86 |
| 2011/0094479 A1* | 4/2011 | Akihisa | F02D 13/0238 123/48 C |
| 2011/0106388 A1* | 5/2011 | Boeckenhoff | B60W 10/06 701/70 |
| 2011/0190972 A1* | 8/2011 | Timmons | G01C 21/34 701/31.4 |
| 2012/0078468 A1 | 3/2012 | Popp et al. | |
| 2012/0109515 A1 | 5/2012 | Uyeki et al. | |
| 2013/0199487 A1* | 8/2013 | Bernard | F02B 27/001 123/184.53 |
| 2014/0012478 A1 | 1/2014 | Schulz et al. | |
| 2014/0121896 A1* | 5/2014 | Valeri | B60Q 9/00 701/36 |
| 2014/0309864 A1* | 10/2014 | Ricci | A61B 5/0077 701/36 |
| 2015/0224995 A1 | 8/2015 | Yamaoka | |
| 2017/0113664 A1* | 4/2017 | Nix | G06F 11/3072 |
| 2017/0144660 A1 | 5/2017 | Kagerer et al. | |
| 2017/0274899 A1 | 9/2017 | Limbacher et al. | |

FOREIGN PATENT DOCUMENTS

| | | | |
|---|---|---|---|
| CN | 103796863 A | 5/2014 | |
| CN | 103942971 A | 7/2014 | |
| CN | 104737216 A | 6/2015 | |
| CN | 104781867 A | 7/2015 | |
| DE | 4205979 A1 | 9/1993 | |
| DE | 19843395 A1 | 3/2000 | |
| DE | 10358968 A1 | 7/2005 | |
| DE | 102007005245 A1 | 11/2007 | |
| DE | 102010028087 A1 | 10/2011 | |
| DE | 102010029467 A1 | 12/2011 | |
| DE | 102010054241 A1 | 6/2012 | |
| DE | 102012214959 A1 | 3/2014 | |
| DE | 102013205218 A1 | 9/2014 | |
| DE | 102014002111 A1 | 8/2015 | |
| DE | 102014014241 A1 | 3/2016 | |
| EP | 2219092 A1 | 8/2010 | |
| EP | 2383679 A1 | 11/2011 | |
| GB | 2505325 B | 2/2016 | |
| WO | WO 2004068439 A1 | 8/2004 | |
| WO | WO 2006037360 A1 | 4/2006 | |
| WO | WO 2016020484 A2 | 2/2016 | |

OTHER PUBLICATIONS

English-language Abstract of German Patent Application Publication No. DE 10358968 A1, published Jul. 21, 2005; 1 page.
English-language Abstract of German Patent Application Publication No. DE 102007005245 A1, published Nov. 22, 2007; 1 page.
English-language Abstract of German Patent Application Publication No. DE 102010028087 A1, published Oct. 27, 2011; 1 page.
English-language Abstract of German Patent Application Publication No. DE 102010054241 A1, published Jun. 14, 2012; 1 page.
English-language Abstract of German Patent Application Publication No. DE 102013205218 A1, published Sep. 25, 2014; 2 pages.
English-language Abstract of German Patent Application Publication No. DE 102014002111 A1, published Aug. 20, 2015; 2 pages.
English-language Abstract of International Patent Application Publication No. WO 2004068439 A1, published Aug. 12, 2004; 2 pages.
English-language Abstract of International Patent Application Publication No. WO 2006037360 A1, published Apr. 13, 2006; 1 page.
International Search Report and Written Opinion directed to related International Patent Application No. PCT/EP2016/001038, dated Nov. 10, 2016, with attached English-language translation; 23 pages.
International Preliminary Report on Patentability directed to related International Patent Application No. PCT/EP2016/001038, dated Nov. 24, 2017, with attached English-language translation; 19 pages.

* cited by examiner

METHOD FOR ASSISTING A DRIVER IN TIME-EFFICIENTLY PERFORMING A JOURNEY WITH A MOTOR VEHICLE, AND MOTOR VEHICLE

TECHNICAL FIELD

The invention relates to a method for assisting a driver in carrying out a time-efficient trip with a motor vehicle, and to a motor vehicle.

BACKGROUND

The focus in driver assistance at this time is primarily the most energy-efficient execution of trips. For example, DE 10 2014 002 111 A1 describes a method for operating a driver assistance system which assists the driver during a coasting process, making it possible to reach a coasting target in the most efficient manner, and enabling assistance to the driver as to when he should take his foot off the accelerator—both when assistance is requested and when assistance is not requested. The advantage of such assistance methods which enable energy-efficient coasting operations is that a "foot-off-the-gas" notification, derived from predictive route data which may originate from navigation systems, for example, can be given much earlier than a driver would do based on his normal estimation. The predictive route data used in this case contains not only information about curve profiles, but also slope gradient information—as well as speed limits and their beginning. The existing signage which instructs a driver to lower the speed limit is often only recognized very late by the driver himself, due to hills or obscurations, such that an early notification can be given, using assistance methods of the named type, that a coasting process would be efficient.

To date, however, driver assistance systems understand "efficiency" only in terms of fuel efficiency, although drivers often wish to arrive at their destination in a time-efficient manner. For example, if the driver is pressed for time on a business trip, energy consumption is often a secondary concern; saving travel time, and thus time efficiency, would be preferable.

The process of calculating a so-called "fastest route" is already known in navigation systems, to provide assistance of this nature. In this case, the route is thus determined in such a manner that a primary optimization aim is the earliest possible arrival time at the selected destination. Nevertheless, there is further potential for improvement, in particular with regard to driving style, along such a route.

BRIEF DESCRIPTION OF THE DRAWINGS/FIGURES

DETAILED DESCRIPTION

Figure 1:
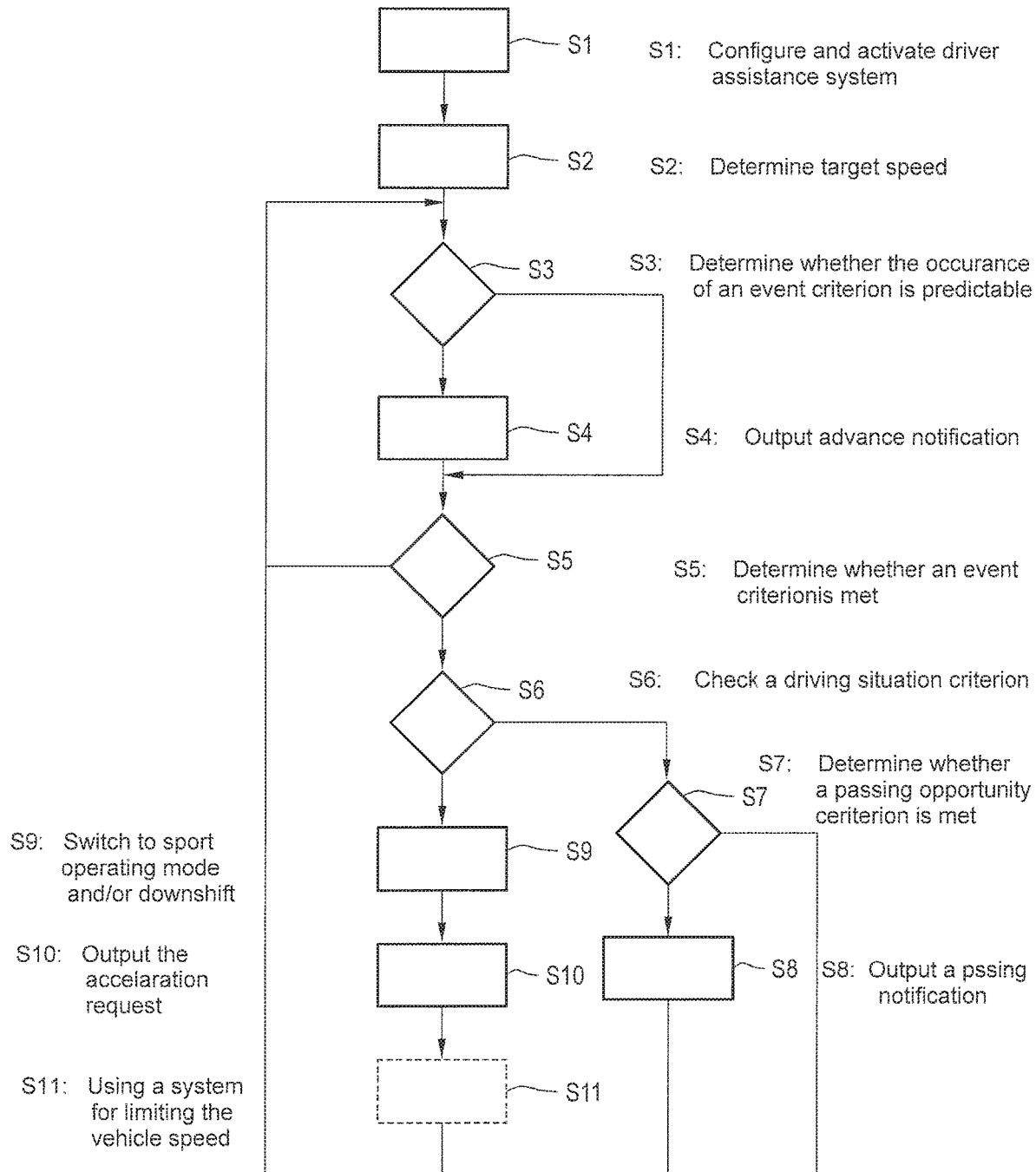
FIG. 1 illustrates an exemplary flow chart of an embodiment of the method according to the invention.

The invention is therefore based on the object of assisting a driver—independently or in addition to the selection of a fastest route in a navigation system—in reaching his destination in a time-efficient manner.

This object is achieved according to the invention by a method for assisting a driver in carrying out a time-efficient trip with a motor vehicle, wherein, when at least one event criterion occurs, upon the occurrence of which the motor vehicle is operated more slowly than a time-efficient target speed assigned to the current position of the motor vehicle, an acceleration request is output to the driver.

The invention therefore suggests providing assistance by means of corresponding driving advice when an event criterion occurs which indicates that the driver could make better use of the currently permitted speed limit in order to reach his destination in a more time-efficient manner. The current driving situation is evaluated to determine whether there is a possibility for the driver to cover the preceding road segment more quickly, such that a situation is particularly prevented in which the driver overlooks options for saving time, such as the removal of speed restrictions and the like. In this way, the driver is assisted during the execution of a trip to reach his destination as quickly as possible by always using the maximum permitted speed optimally. The driver therefore reaches his destination in a much more time-efficient manner.

The assistance mode described here, which can also be described as a "speed-up assistance system" if it is implemented by a driver assistance system, is preferably selectively activated by the driver such that the expectation exists that he will in fact respond to, and/or specifically desires, the corresponding acceleration requests. The duration of the output can be set to a fixed time value, but it is preferred that the acceleration requests are output upon the occurrence of an event criterion until a termination criterion is met. This can indicate, by way of example, that the target speed has been substantially reached and/or there is currently no longer any possibility for acceleration, for other reasons which will be discussed in more detail below.

With regard to the event criterion, various expedient embodiments can be contemplated. As such, in a first preferred embodiment of the present invention, when a location of a speed limit change from a lower speed limit to a higher speed limit is reached, this is considered an event criterion. That is, whenever the driver passes a point at which a lower allowed speed limit turns into a higher allowed speed limit, he receives a corresponding notification that he can now accelerate towards the new allowed speed limit. In this sense, the time-efficiency method according to the present invention therefore works in the opposite manner from the principle of "foot-off-the-gas" assistants, as described above with respect to the prior art, which relate to efficiently coasting to a lower allowed speed limit. It should be noted at this point that ideally, due to the fact that a consumption-efficient coasting process usually requires a loss of time, assistance functions for consumption-efficient driving and time-efficient driving are active in a complementary manner—at least as far as the driving style recommendations are concerned.

Expediently, the location of a speed limit change can be determined from predictive route data of a navigation system and/or an evaluation of data from an environment sensor system, in particular a traffic sign recognition system. In most modern motor vehicles, digital maps are already available. The motor vehicle can be localized within the digital map material. In addition, there exist known possibilities for at least partially predicting the further path of the motor vehicle, both for active and for non-active route guidance. Information about speed restrictions, their endpoints, changes in road types, and the like are also part of this digital map data, which particularly can be stored in a navigation system of the motor vehicle. It can also be contemplated that digital map material is obtained at least partially from communication data of the automobile-to-automobile communication, from which, for example, construction sites, their start and end, and other route characteristics which are relevant to a permitted or sensible speed limit can be determined. Therefore, if a location of a speed limit change is known in the map material, the current position of the motor vehicle and the predictive distance data inevitably reveal when such a location of a speed limit change is coming or has been reached. Alternatively or additionally, it is of course also possible to use an environmental sensor system of the motor vehicle (as well as, optionally, of other motor vehicles). In this context, a traffic sign recognition system which can be used in particular as an image processing algorithm for image data of a camera or the like should particularly be mentioned. For example, if a sign is detected ahead of the vehicle which removes all speed restrictions or sets a speed restriction with a higher speed limit than previously set, a location of a speed limit change is then known as well. Methods have also been suggested in which traffic sign data is transmitted from the motor vehicles detecting it to a server, so the server can update digital map material.

Consequently, this type of event criterion enables recognizing cases in which speed restrictions are increased or removed by means of signs, it is possible to accelerate upon leaving a locality with the speed restriction termination sign thereof, it is possible to accelerate upon merging onto a freeway, and the like.

A second advantageous embodiment of the present invention uses—preferably additionally—an operation of the motor vehicle which is slower than the target speed, in particular by a first threshold value, over a minimum period and/or a minimum distance, as an event criterion. Therefore, if it is determined that the vehicle is operated at a slower speed than the target speed over a relatively long period or a relatively long distance, in particular without a specific reason—as will be discussed in more detail below—an event criterion can be met to output an acceleration request. The minimum period and/or the minimum distance in this case can be parameterized by the user—but are particularly automatically selected according to current driving situation data, such as the current vehicle speed or the speed difference relative to the target speed.

In a particularly preferred, likewise additionally used, third possible embodiment of an event criterion, the removal of an obstacle preventing acceleration, according to predictive route data and/or a driving situation analysis, is used as the event criterion. In some cases, it can be ascertained by a driving situation analysis and/or from the predictive route data that there are reasons why the vehicle is not driving at the target speed, including obstacles that preclude acceleration. Examples of this may be slow road users driving ahead, and/or route characteristics such as curves, poor road surface conditions, and the like. At this point, if monitoring determines that this obstacle no longer exists, the driver can react immediately to the change, and accelerate back to the target speed while saving time. This is because it has been shown that drivers often "waste" the possibility for early acceleration. For example, a gap often opens up when a vehicle ahead, which has been driving more slowly than the target speed, accelerates and/or turns off, or when the driver requires a longer period of time to notice the long, straight road segment following after a tight turn. However, since the environment sensor system and/or predictive route data can easily identify when an obstacle is no longer present, it makes sense, in order to increase time efficiency, to immediately notify the driver of the opportunity for acceleration by means of the acceleration request.

Overall, in the context of the method according to the invention, it is particularly preferred that the output of the acceleration request is suppressed if a driving situation criterion evaluating the current driving situation data and/or predictive route data indicates an obstacle which precludes an acceleration. This means that an acceleration request is only output on the basis of the predictive route data and/or a driving situation analysis if the acceleration is actually possible. Obstacles in such a case can be, with regard to the third embodiment of the event criterion as well, a curve which follows after a straight section, and/or a further road user ahead, and/or a road surface condition. As such, if a further road user is driving slowly ahead of the motor vehicle in question, an acceleration process would only be possible as part of a passing maneuver, which will be discussed in more detail below. With regard to route characteristics, faster driving is often not possible at all. As a result, an acceleration request is suppressed in such a case as well. The driving situation criterion therefore defines driving situations in which no acceleration request should be output.

In an expedient development in cases of such obstacles when a further road user is driving ahead, and in particular when a passing opportunity criterion is met which indicates a passing opportunity, a passing notification indicating to the driver the option of a passing maneuver is output instead of the suppressed acceleration request or in addition to an acceleration request. So-called passing assistance systems have already been proposed. These verify, as part of a complex driving situation analysis, whether a passing maneuver is possible, and then output a corresponding notification. Although such things can also be integrated into the assistance system described in the context of the present invention, it is also possible to implement designs which are easy to realize. As such, in the simplest case, a passing opportunity criterion can be verified—for example, based on digital map data—to see whether or not passing is allowed in the road segment currently being traveled. The assessment of the driving situation is then advantageously left to the driver, who can best estimate the risks from his experience. The passing notification is expediently output visually, wherein preferably at least a component of the passing notification is output by activating a direction indicator light within the motor vehicle. In this way, a driver is particularly intuitively advised that a passing maneuver would be appropriate for the time efficiency of his trip and—if an appropriate passing opportunity criterion exists—ideally also that passing is currently allowed (and optionally can currently be carried out under ideal conditions).

In an advantageous development of the invention, in addition to the acceleration request, at least one vehicle system is preconditioned by specifying operating parameters for an imminent acceleration. Since, particularly if the driver himself has activated the assistance mode for time-efficient driving, an acceleration process is very likely after an acceleration request, it may be appropriate to adapt vehicle systems to the upcoming acceleration with respect to their operating parameters—thus conditioning them in advance. In an advantageous development of this embodiment, a sport mode of operation of a transmission of the motor vehicle is activated and/or the transmission is shifted down one gear. A sport mode of operation of a transmission (and/or of the entire drivetrain) enables more dynamic driving overall, and therefore faster acceleration to the target speed. A downshift of an automatic transmission also constitutes a corresponding preconditioning.

There are a multitude of possibilities for issuing the acceleration request, since the acceleration request can be output at least partially visually and/or at least partially acoustically and/or at least haptically. For this purpose, suitable output means within the motor vehicle are utilized. It is preferred in this case, as will be explained in more detail below, to implement a combination of visual and haptic output.

It is therefore initially conceivable that the acceleration request is output at least partially visually. For this purpose, a head-up display and/or augmented reality glasses can be used for at least part of the visual output. In this way, the acceleration request can be superimposed in the field of view of the driver, where he is already observing the traffic situation, in a manner allowing intuitive and easy understanding. The driver can react immediately and start an acceleration process. Although, in principle, a visual output via other output means, such as a screen and/or a display element of an instrument panel, can be contemplated, this is less preferable, since the driver must first turn away from the driving situation to perceive the notification, which could initially delay an acceleration process and work against the desired time efficiency.

Head-up displays and augmented reality glasses are known in the prior art. It should be noted that it is not strictly necessary to reproduce a depiction element which forms part of the acceleration request as a contact-analog function—for example on the currently traveled lane. However, this can be realized particularly expediently with respect to the head-up display.

In generally, it is particularly expedient if the visual output of the acceleration request contains information describing the target speed, so that the driver is also aware of the target speed the acceleration request anticipates. The target speed can be output as a numerical value, for example; however, it is preferable that the speed difference between the current speed of the motor vehicle and the target speed is quantified and/or visualized in another manner.

Accordingly, in a particularly preferred embodiment of the present invention, the acceleration request comprises at least one depiction element which is dependent on the speed difference between the current speed of the motor vehicle and the target speed, and describes the need for the speed increase. This way, the driver is not only made aware that an acceleration is expedient to reach his destination in a time-efficient manner, but also he receives information as to the intensity of an acceleration which must be carried out.

It has proved to be particularly expedient if the and/or a depiction element comprises a number of arrow elements which symbolize the acceleration and are dependent on the speed difference. For example, the arrow elements can be oriented upwards, in particular following the further course of the road surface in a contact-analog representation on a head-up display or augmented-reality glasses. For example, between one and a maximum of three collinear arrows can be used, wherein more arrows displayed indicates a greater difference in speed.

Furthermore, it has proven to be expedient if, on a display device assigned to a speed indicator device, in particular an LED ring of an indicator instrument, the speed difference to the target speed is visualized as a depiction element. Such display means, which are usually used as part of other driver assistance systems—for example, to display a control speed in a longitudinal driver assistance system—can therefore be given a further purpose in the context of the present invention. In particular, LED rings can be practically utilized as indicator instruments for displaying the current vehicle speed. For example, it is possible in this case to illuminate the region between the current speed of the motor vehicle and the target speed, wherein such an output can also be animated, for example, by sequential operation of the individual LEDs towards the target speed, which in turn intuitively symbolizes the possibility for acceleration.

Of course, other depiction elements which can describe the speed difference in a compact and intuitive manner can be contemplated as well. By way of example, a concretely time-related symbolic depiction—for example as a stylized clock which reproduces the speed differences by means of its hands, and the like—can be contemplated as well. Furthermore, it should be pointed out that additional output options, for example on the navigation system, or any general display means assigned to the vehicle guidance—for example, an instrument cluster—can also be contemplated and practical, of course.

It is particularly preferred that the depiction element is continuously updated as a function of the current speed difference as an acceleration process is initiated, and in particular until the target speed has been reached. In this manner, the driver is ultimately presented with the result of his acceleration—with a process wherein he can also see the speed difference diminishing until the target speed is reached, and the acceleration request then fades out. If, for example, there is initially a significant difference in speed—for example, as the vehicle leaves a locality with an allowed speed limit in the locality of 50 km/h and accelerates to 100 km/h—three arrows can initially be displayed. If the speed difference during the now-specified acceleration process falls below a certain first threshold—for example, 30 km/h—only two arrows are displayed, whereas, for example when the speed difference falls below 10 km/h, as a further threshold, only one arrow is displayed. The driver recognizes that an acceleration still makes sense, but the speed difference to the target speed is smaller.

A further preferred variant for the output is that the acceleration request is output at least partially haptically. In this case, it is particularly preferred if the haptic output is implemented via an actuator assigned to an accelerator pedal, in particular as a vibration of the accelerator pedal, and/or is selected according to the speed difference between the current speed of the motor vehicle and the target speed. So-called "active" accelerator pedals have already been suggested. In this case, a distinction can be made between vibration-capable accelerator pedals which can carry a vibration with a specific amplitude and frequency—which are rather inexpensive to implement—and accelerator pedals with more complex actuators, in which the pressure point can be shifted, and also the pressing resistance can be adjusted. Ultimately, in such active accelerator pedals, the force-displacement curve is customizable. However, due to the more complex development and possibly more-difficult acceptance, such embodiments are less preferred. Overall, the accelerator pedal is considered to be advantageous as an output point for the acceleration request, since there is an intuitive understanding of the relationship between the information being given—namely the possibility of acceleration—and the output location. Because the driver is, after all, the person driving the vehicle when the method according to the invention is utilized, it can be assumed that his foot is on the accelerator pedal and that he therefore also perceives this component of the acceleration request. In the preferred embodiment of the haptic output of the acceleration request as a vibration, a wide variety of configurations for the output design can be contemplated. Preferably, as the acceleration request is initiated, a very slight, non-distracting vibration begins, and is just barely perceptible. Amplitude and frequency are fixed. The vibration is continued until the target speed is reached. On the other hand, it may be expedient to choose the amplitude and/or the frequency as a function of the speed difference, such that, for example in the case of a large speed difference, there is a stronger vibration than in the case of a low speed difference, and therefore the driver also notices when performing the acceleration process, as a result of the decreasing vibration, that he is approaching the target speed. However, the variable frequency and/or amplitude of the vibration can also be used in another manner—for example, to give the effect of a growing acceleration request. For example, if no acceleration process is initiated, the frequency and/or amplitude of the vibration can increase slowly to further illustrate the driver's loss of time by not performing the acceleration. In such a case, for example, the vibration frequency can be continuously increased more and more until the driver starts to accelerate. The vibration can then be terminated, or alternatively continued at a fixed frequency until the target speed is reached, wherein the amplitude of the vibration can then advantageously decrease with the speed difference.

In another development of the invention, the acceleration request is output at least partially acoustically. An audible acceleration request can therefore also be contemplated within the scope of the present invention. In this case, for example, an output device which generates and/or influences the output of an engine noise can be used for the acoustic output. Because a downshift, as already discussed, can result in an increase in the engine noise, such an effect can also be achieved artificially if corresponding output means and/or actuators are available which allow influence upon the engine noise—especially supplementing the same. Such an "active engine noise" can also be understood as an intuitive and subtle indication to accelerate.

Of course, however, other types of acoustic output can be contemplated, such as text announcements, which can be optionally selected and, for example, cover other aspects of the operation of the motor vehicle—for example, as a kind of "co-pilot" which provides suggestions.

In a particularly advantageous embodiment of the present invention, the acceleration request is output in such a manner that at least its visual and/or haptic component can only be perceived by a driver. This advantageously prevents a disturbance and/or irritation of other occupants of the motor vehicle, particularly a feeling of stress arising in the event of perception of acceleration requests. It is particularly useful in this case if, as already mentioned, a head-up display or augmented reality glasses are used together with an accelerator pedal actuator for the visual and haptic output of the acceleration request. These media are designed to provide information content which is only perceived by the driver.

In a further, particularly preferred embodiment of the present invention, an advance notification announcing the acceleration possibility is output after the selection of an advance notification function by the user, at a time prior to the occurrence of the predictable event criterion. In this way, it is ultimately possible to create a sort of staging concept for the acceleration request. In a first stage, a first, particularly unobtrusive, advance notification is given, which is preferably likewise and/or only perceptible by the driver of the motor vehicle, before the occurrence of the event criterion—for example a predetermined distance, in particular 200 m, before reaching a location of a speed limit change. In a second stage, when the event criterion occurs, the actual acceleration request is output, and the driver has accordingly prepared for the same such that he can, for example, carry out a pre-acceleration, and the like.

In this case, it is particularly expedient for the advance notification to include information on the distance before the occurrence of the event criterion and/or for the time point to be selected as a function of at least one driving situation parameter, in particular the current speed of the motor vehicle. The advance notification can also expediently inform the driver as to how far he still needs to travel before the new, higher target speed, so that it is not necessarily chosen with a fixed time relationship to an acceleration request. For example, the output of the advance notification may include an element which is output visually, and which indicates that all speed restrictions will be removed in 200 m, for example. On the other hand, as mentioned, the output of the advance notification can preferably be timed in such a manner that it is output as far as possible at a fixed time interval before the occurrence of the event criterion. For example, the time at which the advance warning is output can be selected according to the current speed of the motor vehicle—although, of course, more complex determinations are also possible in principle. Of course, it can also be contemplated that a fixed spatial distance to the predictable occurrence of the event criterion is selected as relevant for the time point.

It is also particularly expedient if the depiction element described above, which describes the need for a speed increase, is actually output together with the advance notification, but is preferably modified to emphasize that it is an advance notification, and/or the displayed intensity thereof is reduced. In this way, the driver is also shown in more detail the nature of the soon-to-occur event criterion in terms of the acceleration possibilities, which can also be achieved by the addition of a depiction element which relates to the new target speed at the occurrence of the event criterion. However, to prevent a premature, strong acceleration, the depiction element which describes the need to increase speed can be shown in a muted form and/or clearly marked as an advance notification—for example, grayed-out. For the depiction element related to the target speed after the occurrence of the event criterion, it is particularly expedient to combine the same with a further depiction element which shows the distance which will be traveled before the occurrence of the event criterion, such that the driver can be given distance information along with the newly permitted speed limit, for example in the case of a location of a speed limit change. The types of output of the acceleration request and the advance notification are particularly preferably matched to one another, such that it can be seen that they are assigned to the same assistance function. As such, the statements pertaining to the output of the acceleration request also apply to the output of the advance notification. It is particularly preferred that it is output in a manner allowing visual and/or haptic perception only for the driver, wherein preferred output means are a head-up display, augmented reality glasses, and an actuator on an accelerator pedal.

In an advantageous embodiment, the target speed can be selected according to the speed limit which is permitted once the event criterion has been met—and in particular, is selected to be this speed. In this way, the assistance function can provide a stimulus, on the one hand, for a maximum utilization of the speed limit, and on the other hand, for the most precise possible observance of the same. All the same, speed limits are frequently perceived by drivers with a certain tolerance range, such that there are drivers which would like to slightly exceed or slightly drop below the same.

In consideration of such drivers, in an expedient development of the invention, the target speed is determined according to driver data, the same particularly entered as a percentage and/or determined from an allowable deviation value from the speed limit previously determined from driving behavior of the driver. It is therefore possible that, to determine the target speed, a driver inputs a desired deviation from the speed limit, in particular as a percentage—i.e., that he would like to exceed or drive more slowly than the speed limit by one percent, by way of example. However, it is particularly expedient if such a deviation value is automatically determined by an analysis of the driver's driving behavior to-date. By way of example, if the previous trip or past trips of the driver show that he generally drives two percent faster than the nominal speed limit, a corresponding deviation value, and therefore a corresponding target speed, can be selected. Consequently, the specific driving style of the driver can be taken into account.

It should also be noted that the time efficiency can be considered on a longer time scale if the driver's destination is known—for example, in the event that the driver is using active navigation assistance. Not only is it expedient for the navigation system to always automatically calculate the fastest route in such a case, but other time factors can be considered as well. An example of such a time factor is a stop at a refueling or recharging station where the consumer can replace spent fuel or consumed energy. This stop comes with relatively high time losses, which can add up to a large share of the total trip duration. However, it may be the case that the quantity of consumed energy from the tank and/or a battery is small, such that it is conceivable for somewhat more efficient—and especially slower—driving to avoid the refueling stop, thereby saving time in an overall assessment.

If such a determination is made, it may be expedient in the context of the present invention that, if a time savings criterion is met which evaluates navigation data from a navigation system and indicates the possibility of avoiding a refueling and/or recharging stop so as to save time in terms of the trip overall, the target speed is reduced to achieve this possibility, and/or, if present, a depiction element is modified to show the lesser need for acceleration. That is, if the determination is made that, for example, a lower target speed will result in an accordingly reduced consumption which can prevent a refueling stop, the target speed is accordingly reduced—but only if, in fact, this will result in a time savings due to the elimination of the refueling and/or recharging stop, in view of the trip as a whole.

When an acceleration to a new target speed is performed, it is particularly easy for the same to "overshoot," so to speak. This is because the acceleration does not immediately drop to zero upon the release of the accelerator pedal; rather, it is slowly reduced so as to achieve the optimal driving experience. In a preferred embodiment variant of the present invention, in order to enable a more targeted approach up to the target speed without appreciably exceeding the same, an acceleration beyond the target speed is prevented during an acceleration up to the target speed by at least one intervention in the drive train—in particular, a limitation of the engine torque. Motor vehicles in which systems for limiting the vehicle speed (so-called "speed limiters") have been implemented are already known. These systems can be used expediently in the present invention to prevent acceleration beyond the target speed and to guide the vehicle in a targeted and comfortable manner up to the new target speed. As such, the system for limiting the vehicle speed can briefly activate automatically at the end of the acceleration process, limiting the speed to the target speed in this case.

In addition to the method, the invention also relates to a motor vehicle, having a driver assistance system for assisting a driver in carrying out a time-efficient trip, wherein the driver assistance system has a control device designed for implementing the method according to the invention. When the method according to the invention is used, a "speed-up assistant" as described above can therefore be implemented in a motor vehicle. All statements regarding the method according to the invention can be applied analogously to the motor vehicle according to the invention, with which the advantages mentioned above can likewise be obtained.

Figure 2:
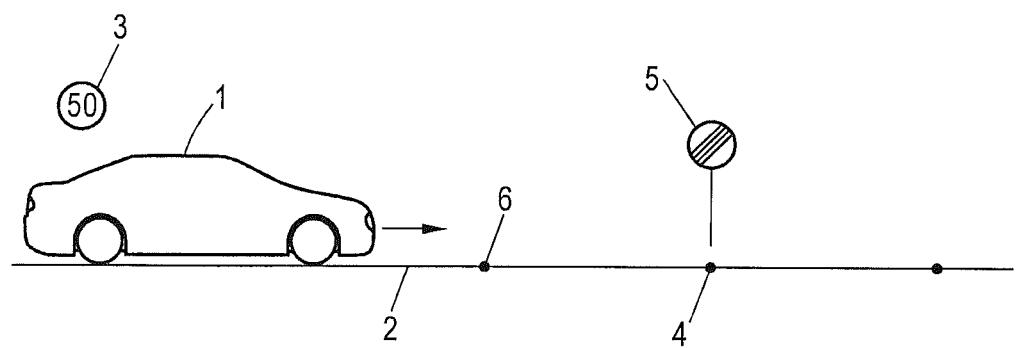
FIG. 2 illustrates a schematic representation to explain the method in a traffic situation.
Figure 3:
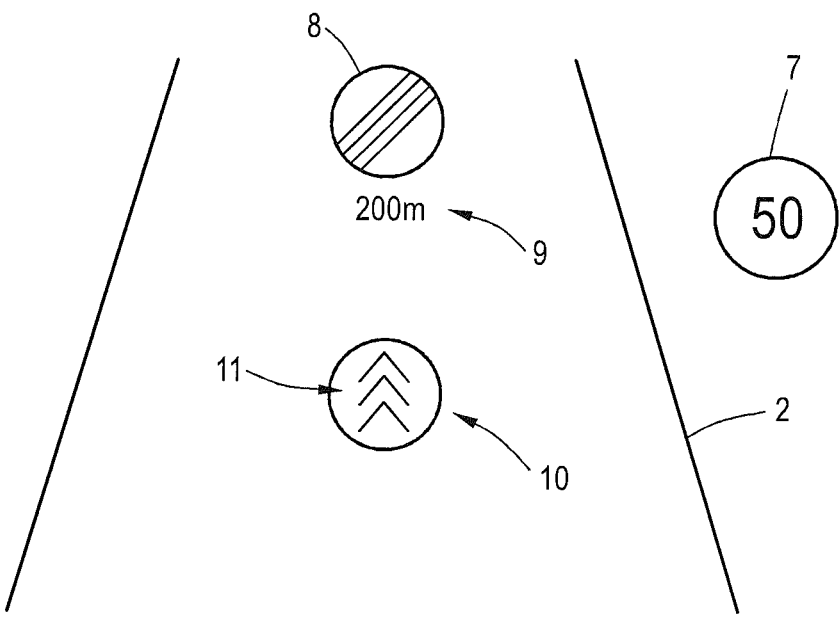
FIG. 3 illustrates a schematic representation of a visual component of an advance notification.
Figure 4:
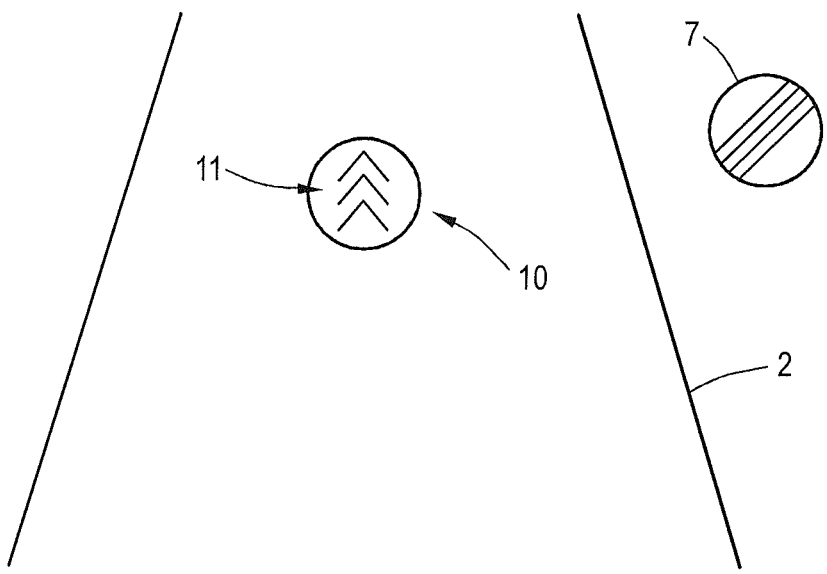
FIG. 4 illustrates a schematic representation of a visual component of an acceleration request.
Figure 5:
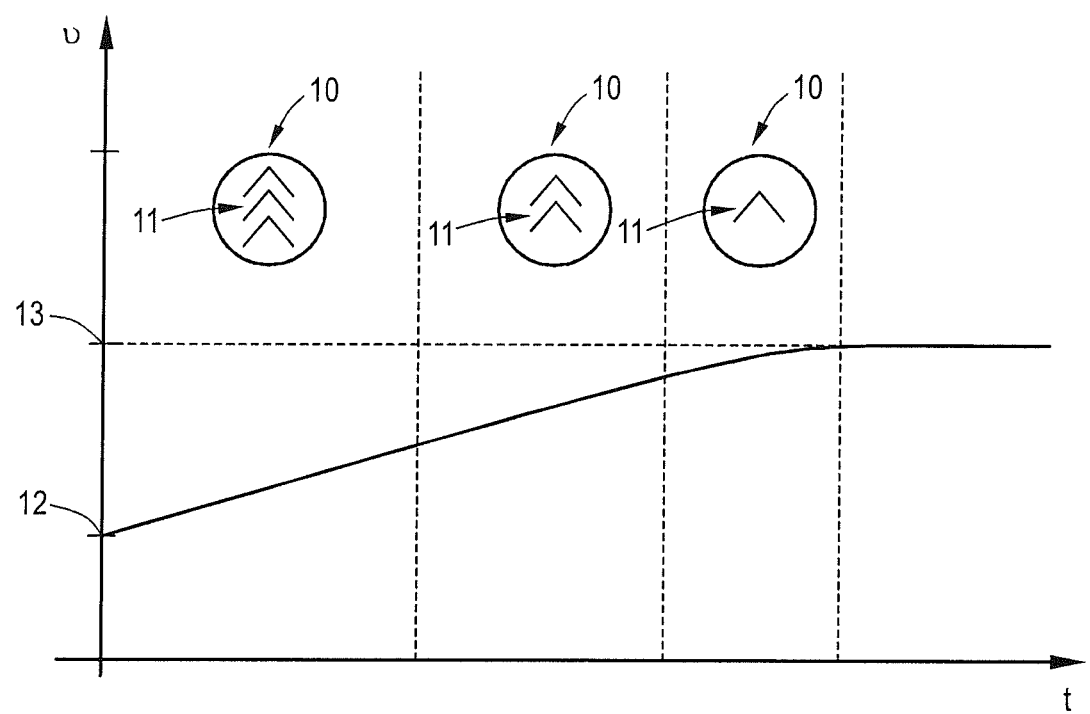
FIG. 5 illustrates a schematic representation of the change in a display element during an acceleration process.
Figure 6:
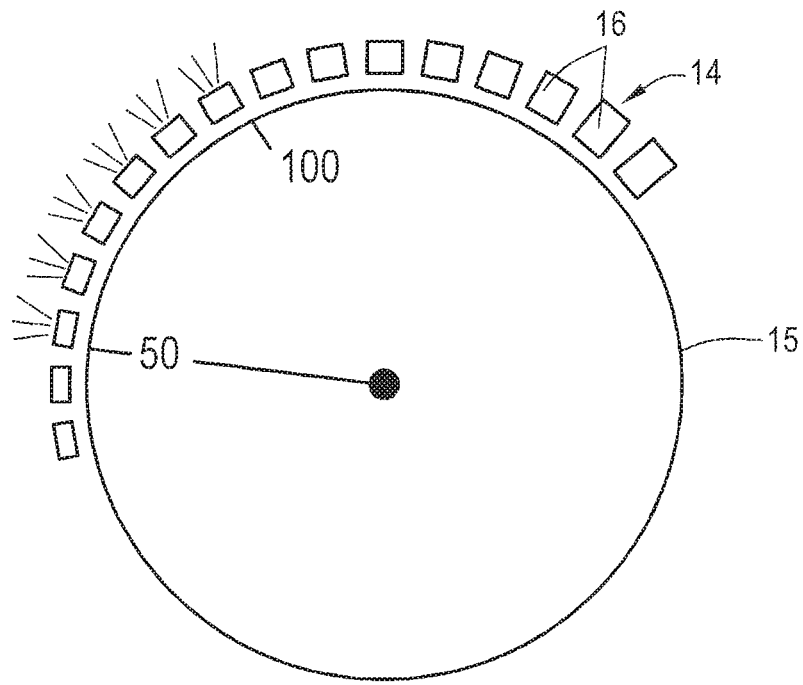
FIG. 6 illustrates a schematic representation of the use of an LED ring in an indicator instrument.
Figure 7:
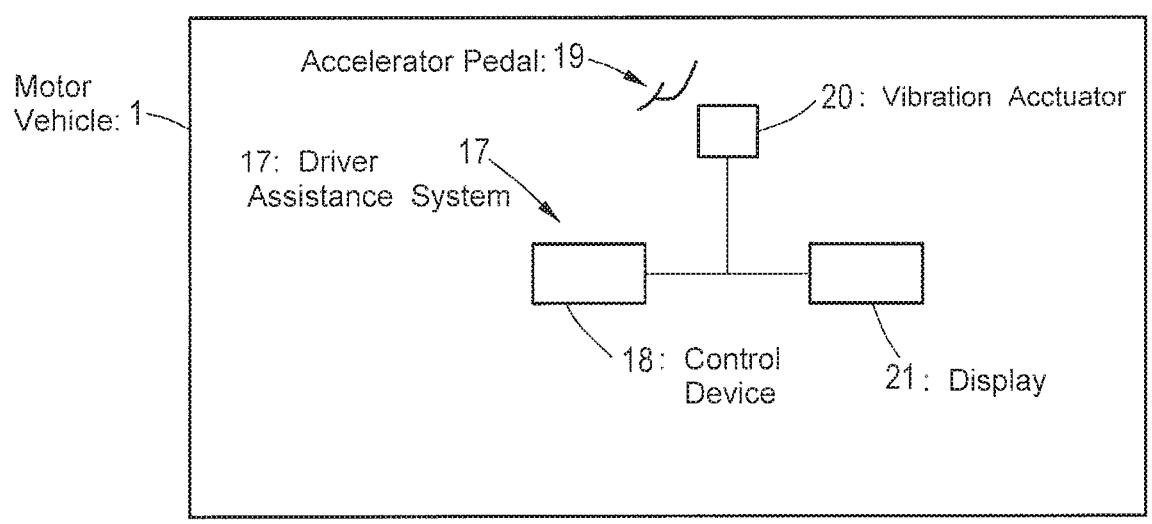
FIG. 7 illustrates a schematic diagram of a motor vehicle according to the invention.

Further advantages and details of the present invention will become apparent from the embodiments described in the following, and with reference to the drawings, wherein:

FIG. 1 shows a flow chart of an embodiment of the method according to the invention, FIG. 2 shows a sketch to explain the method in a traffic situation, FIG. 3 shows a visual component of an advance notification, FIG. 4 shows a visual component of an acceleration request, FIG. 5 shows the change in a display element during an acceleration process, FIG. 6 shows the use of an LED ring in an indicator instrument, and FIG. 7 shows a schematic diagram of a motor vehicle according to the invention.

FIG. 1 shows a flow chart of an embodiment of the method according to the invention, for assisting a driver in carrying out a time-efficient trip with a motor vehicle, wherein the driver can be assisted in terms of driving style in such a manner that the currently permitted speed limits are optimally utilized to reach a destination in a time-efficient manner.

In a step S1, the corresponding driver assistance system used for assisting a driver in carrying out a time-efficient trip is configured and activated, thereby starting the assistance function. The driver can select an additional advance notification before an acceleration request—that is, a two-stage notification, which will be assumed to be selected in the present case—and can also determine how the target speed is derived from the speed limit. For this purpose, the driver can enter a deviation value; it can also be contemplated, however, that the deviation value is derived from driver data on past driving behavior.

In step S2, the target speed for the route currently being traveled is determined accordingly, since this is relevant for several event criteria which will be discussed further below. The target speed is then determined—if a deviation value is being used, taking into account the same—from the speed limit, and otherwise is the speed limit itself.

In the embodiment discussed here, a plurality of possible event criteria is considered. One event criterion is when a location of a speed limit change from a lower speed to a higher speed is reached. Such a location can be determined from predictive route data, which in the present case is derived from digital maps of a navigation system, but can also be derived from a traffic sign recognition system. In this first type of event criterion, the location where it will occur is therefore known clearly in advance—especially if predictive route data is used. This event criterion thus constitutes the essential area of application of an advance notification, which will be discussed below.

A second type of event criterion used in this case relates to an operation of the motor vehicle which is slower than the target speed, in particular by a first threshold value, for a minimum period of time or a minimum distance. When this criterion is present, an advance notification makes little sense, since there is no need to wait to accelerate back up to the target speed.

A third type of event criterion used in the present case is the removal of an obstacle preventing acceleration, according to predictive route data and/or a driving situation analysis. This event criterion can then be considered relevant to a certain extent for an advance notification, especially if the obstacle is a route characteristic such as a curve or a poor road surface condition. In this case, the moment when this aspect will no longer pose an obstacle, such that an advance notification is reasonable and useful in this case, can be very well known from predictive route data. However, if another road user constitutes the obstacle—for example, a preceding vehicle—the evaluation of when it no longer poses an obstacle is more difficult. The occurrence of the event criterion can then be predicted in cases, for example, when the preceding road user indicates, for example, the desire to turn off the road at a point ahead, or the like—for example via automobile-to-automobile communication. Another conceivable case is when the environment sensor data is used to recognize that the preceding road user will soon turn off or accelerate. As such, there is likewise a certain relevance of the third type of event criterion for an advance notification.

Accordingly, in a step S3, a verification is made to determine whether the occurrence of an event criterion is predictable. If this is the case, and there is a position ahead where an event criterion will occur, an advance notification is output in a step S4 at a point in time before this position is reached. The time point, and in particular the current speed of the motor vehicle, can be selected dynamically based on driving situation data, or, for example, on the basis of passing a fixed distance to the position at which the event criterion will occur—for example, the location of a speed limit change.

This is explained in more detail with regard to FIG. 2, which schematically shows a motor vehicle 1 on a road 2. At this moment, as indicated by the road sign 3, it is in an area where the speed limit is 50 km/h. It is known from predictive route data that a traffic sign 5 which removes all the speed restrictions is positioned at a location 4 of a speed limit change; starting there, the speed limit which is generally allowed on the highway, for example 100 km/h, applies at this point. The motor vehicle 1 then reaches the position 6 which is before the location 4 of a speed limit change. The advance notification is output at this point—specifically at a distance of 200 m—so that the driver of the motor vehicle 1 can prepare himself for the acceleration possibility which will soon arise.

The advance notification is output in the illustrated embodiment in such a manner that only the driver can perceive it—specifically, in part visually and in part haptically. A possible visual component of the output of an advance notification is illustrated in FIG. 3 in more detail. Because a head-up display is used in this case, the road 2 can be seen through the windshield of the motor vehicle. In general, the currently allowed speed limit is shown in overlay by means of a symbol 7 next to the road 2. A symbol 8 depicted in this case as contact analog information overlaid on the road 2 ahead provides an early indication of the speed limit which will then be allowed (and therefore, the target speed) after the cancellation of all speed restrictions is depicted visually. The corresponding distance 9 is displayed below the symbol 8 as a depiction element which indicates the distance, particularly while keeping up with the forward movement of the motor vehicle 1. A depiction element 10 with three arrows 11 pointing upward is also a further component of the advance notification in this case, but is grayed out. The depiction element 10 finally shows the acceleration demand—that is, the need for a speed increase—wherein the number of arrows depends on the difference in speed between the current speed of the motor vehicle 2 and the target speed after the occurrence of the event criterion. The depiction element 10 is characterized as an advance notice by virtue of being grayed out.

The haptic component of the advance notification is output via an accelerator pedal—in this case, more specifically, the vibration by means of an actuator. For example, a slight vibration can be used as the advance notice in this case.

Returning to FIG. 1, in a step S5, a verification is made to see whether an event criterion has been met. However, if this is the case, an acceleration request is not immediately output. Rather, a driving situation criterion is first checked in a step S6. If it is met, this means that an obstacle to the acceleration currently exists—whether a route characteristic such as a curve, or a road user driving ahead. In such a case, no acceleration request is output in this embodiment. Rather, a verification is made in a step S7 to see whether a passing opportunity criterion might be met. This is of course only applicable where there is a further road user driving ahead. As a passing opportunity criterion, a verification is made in this embodiment to see if there is no passing ban—which can be concluded, for example, from the digital map material and/or from a traffic sign recognition system. If, in step S7, the passing opportunity criterion is met, with a road user driving ahead, in a step S8 a passing notification is output which stimulates the driver to check whether he would like to make a passing maneuver to reach his destination in a more time-efficient manner. However, in this embodiment, the assessment of the driving situation to determine whether a passing maneuver can even be performed without danger is left to the driver. However, in other cases, the passing opportunity criterion can also be extended, specifically to output a passing notification, if there are appropriate analysis facilities in the motor vehicle 2. In this case, the passing notification would be output more emphatically.

In the present case, the output of the passing notification always includes the activation of a direction indicator light in the instrument cluster of the motor vehicle 1—of course, without the direction indicator light itself being actuated. The passing notification can also likewise be output visually on the head-up display, by way of example.

If it is determined in step S6 that no obstacle is present, which may be the case in particular if the event criterion has been used to determine there is no longer an obstacle—for example if a road user driving ahead has turned off—then in a step S9, the powertrain is preconditioned by switching to a sport operating mode. In addition, a downshift by one gear can also be contemplated, since an acceleration process is naturally expected.

In a step S10, the acceleration request is then output, again using visual and haptic output means, including the head-up display and the active accelerator pedal. This is illustrated in more detail with regard to FIGS. 2, 4 and 5. According to FIG. 2, in step S5 the determination is made at the location 4 of a speed limit change that the event criterion is satisfied. The corresponding output via the head-up display is shown in FIG. 4. Of course, the symbol 7 then indicates the lifting of all speed restrictions, while the depiction element 10, no longer grayed-out and now clearly visible—for example, as clearly green arrows—is illustrated on the road 2 as contact analog information. This is immediately perceived by the driver, such that he can start the acceleration process intuitively and without the need to avert his gaze from the driving situation. Since the number of arrows 11 in the depiction element 10 depends on the difference in speed to the target speed, it changes dynamically during the ensuing acceleration process, as explained in more detail by FIG. 5.

In FIG. 5, the profile of the speed v of the motor vehicle 1 is plotted against the time t, beginning at the target speed 12 prior to the location 4 of a speed limit change and ending at the target speed 13 after the location 4 of a speed limit change. The number of arrows is selected according to the magnitude of the remaining difference in speed between the current speed of the motor vehicle 1 and the target speed 13. As the depiction elements 10 in FIG. 5, illustrated as assigned to the certain intervals of speed difference, show, the number of arrows 11 decreases with increasing proximity to the target speed 13, until the acceleration request is no longer output.

The situation is similar for the vibration of the accelerator pedal described previously, which decreases in amplitude more and more as the target speed 13 is approached, and is likewise terminated when the same is reached.

FIG. 6 shows a further possibility for realizing a visualization of the difference in speed, with the use of an LED ring 14 of an indicator instrument 15. It can be seen that the LEDs 16 are illuminated in the region between the current speed of the motor vehicle 1 and the target speed 13, which can also be realized in the manner of a sequence of illumination from bottom to top to convey the acceleration request more intuitively.

It should be noted that other output means can of course be used for outputting the acceleration request—for example, further visual output means, acoustic output means such as those for text messaging, and the like. However, it is preferred that the acceleration request is output in a manner which can only be perceived by the driver.

In an optional step S11 (see FIG. 1), the target speed 13 cannot be exceeded. For this purpose, a system for limiting the vehicle speed ("speed limiter") is used—in this case limiting the engine torque. As a result, as illustrated in FIG. 5 as well, a comfortable approach to the target speed 13 is achieved.

Finally, FIG. 7 shows a schematic diagram of the motor vehicle 1 according to the invention. It has, as already mentioned, a driver assistance system 17 for assisting the driver in carrying out a time-efficient trip. This comprises a control device 18 which is designed to carrying out the method according to the invention, and therefore communicates with further components of the motor vehicle 1—in particular, the output means—wherein, in this case, purely by way of example, the vibration actuator 20 assigned to the accelerator pedal 19 and the head-up display 21 are indicated.

The invention claimed is:

1. A method for assisting a driver in carrying out a time-efficient trip with a motor vehicle, the method comprising:
   outputting an acceleration request to the driver in response to at least one event criterion occurring where the motor vehicle is operated at a speed lower than a time-efficient target speed associated with a current position of the motor vehicle; and
   in response to the at least one event criterion occurring, adjusting at least one vehicle system by specifying operating parameters for an imminent acceleration, wherein the adjusting the at least one vehicle system comprises:
   activating a sport mode of operation of a transmission of the motor vehicle, or
   shifting down one gear the transmission of the motor vehicle.

2. The method according to claim 1, wherein the at least one event criterion comprises reaching a location of a speed limit change from a lower speed limit to a higher speed limit.

3. The method according to claim 2, further comprising:
   determining the location of the speed limit change based on predictive route data of a navigation system or an evaluation of data from an environment sensor system.

4. The method according to claim 3, wherein the determining the location of the speed limit change comprises:
   using a traffic sign recognition system for the evaluation of data.

5. The method according to claim 1, wherein the at least one event criterion comprises operating the motor vehicle at the speed lower than the time-efficient target speed by a first threshold value, over a minimum time period or over a minimum distance.

6. The method according to claim 1, wherein the at least one event criterion comprises removal of an obstacle preventing acceleration of the motor vehicle according to predictive route data or a driving situation analysis.

7. The method according to claim 1, further comprising:
   suppressing the acceleration request in response to a driving situation criterion that is based on current driving situation data or in response to predictive route data indicating an obstacle, which precludes an acceleration of the motor vehicle.

8. The method according to claim 7, wherein the obstacle comprises a curve which follows after a straight section, or a road user ahead of the motor vehicle, or a road surface condition.

9. The method according to claim 8, further comprising:
   outputting a passing notification in response to a passing opportunity criterion being met which indicates a passing opportunity over a road user driving ahead of the motor vehicle, wherein the passing notification indicates to the driver of the motor vehicle an option for a passing maneuver instead of the suppressed acceleration request or in addition to the acceleration request.

10. The method according to claim 1, wherein the outputting the acceleration request comprises:
    at least partially visually outputting the acceleration request.

11. The method according to claim 10, further comprising:
    using a head-up display or augmented reality glasses for the at least partially visually outputting the acceleration request.

12. The method according to claim 10, wherein the acceleration request comprises at least one depiction element that is dependent on a speed difference between the speed of the motor vehicle and the time-efficient target speed.

13. The method according to claim 12, wherein the depiction element in visually displayed using:
a number of arrow elements, wherein the number of arrow elements symbolize the acceleration and depend on the speed difference; or
an LED ring of an indicator instrument on a display device.

14. The method according to claim 12, further comprising:
updating the depiction element based on the speed difference until the time-efficient target speed is reached.

15. The method according to claim 1, wherein the outputting the acceleration request comprises:
at least partially haptically outputting the acceleration request.

16. The method according to claim 15, further comprising:
using an actuator associated with an accelerator pedal for the at least partially haptically outputting the acceleration request.

17. The method according to claim 16, wherein the using the actuator comprises:
controlling a vibration of the accelerator pedal based on a speed difference between the speed of the motor vehicle and the time-efficient target speed.

18. The method according to claim 1, wherein the outputting the acceleration request comprises:
at least partially acoustically outputting the acceleration request.

19. The method according to claim 18, further comprising:
generating or influencing an output of an engine noise for the at least partially acoustically outputting the acceleration request.

20. The method according to claim 1, wherein the outputting the acceleration request comprises outputting the acceleration request visually or haptically such that it is only perceived by the driver.

21. The method according to claim 1, further comprising:
outputting an advance notification indicating an acceleration possibility after a selection of an advance notification function by the driver prior to an occurrence of the at least one event criterion.

22. The method according to claim 21, wherein the advance notification comprises information on a distance before the occurrence of the at least one event criterion or a time point selected based on at least one driving situation parameter.

23. The method according to claim 22, wherein the acceleration request comprises at least one depiction element and the outputting the advance notification comprises:
outputting the depiction element at substantially same time as the advance notification; and
modifying the depiction element of the acceleration request.

24. The method according to claim 1, further comprising:
determining the time-efficient target speed based on a speed limit after the at least one event criterion is met.

25. The method according to claim 24, wherein the determining the time-efficient target speed further comprises:
determining the time-efficient target speed further based on driver data, wherein the driver data indicates an allowable deviation value from the speed limit previously determined from driving behavior of the driver.

26. The method according to claim 24, wherein the determining the time-efficient target speed further comprises:
reducing the time-efficient target speed in response to a time savings criterion being met, wherein the time savings criterion evaluates navigation data from a navigation system and indicates a possibility of avoiding a refueling stop or a charging stop.

27. The method according to claim 1, further comprising:
preventing an acceleration beyond the time-efficient target speed during the acceleration up to the time-efficient target speed.

28. The method according to claim 27, wherein the preventing the acceleration comprises:
limiting an engine torque of the motor vehicle.

29. The method according to claim 27, wherein the preventing the acceleration comprises:
performing an intervention in a drive train of the motor vehicle.

30. A motor vehicle, comprising:
a driver assistance system configured to assist a driver in carrying out a time-efficient trip; and
a control device configured to:
output an acceleration request to the driver in response to at least one event criterion occurring where the motor vehicle is operated at a speed lower than a time-efficient target speed associated with a current position of the motor vehicle; and
in response to the at least one event criterion occurring, adjust at least one vehicle system by specifying operating parameters for an imminent acceleration, wherein to adjust the at least one vehicle system the control device is configured to:
activate a sport mode of operation of a transmission of the motor vehicle, or
shift down one gear the transmission of the motor vehicle.

* * * * *